United States Patent Office 3,022,262
Patented Feb. 20, 1962

3,022,262
MODIFIED GLYCIDYL METHACRYLATE COMPOSITIONS
Thomas J. Hyde, Woodbury, N.J., assignor to E. I. du Pont de Nemours and Company, Wilmington, Del., a corporation of Delaware
No Drawing. Filed Dec. 31, 1957, Ser. No. 706,255
8 Claims. (Cl. 260—43)

The present invention relates to novel compositions valuable as molding and potting compositions, adhesives, laminating agents, and the like. More specifically, the present invention relates to a composition of glycidyl methacrylate, pyromellitic dianhydride, maleic anhydride, or cyclopentanetetracarboxylic dianhydride or mixtures thereof, and an alcohol modifier.

The resinous compositions formed by crosslinking glycidyl methacrylate exhibit outstanding physical and chemical properties. The conditions under which glycidyl methacrylate is converted to a thermosetting resin and the physical and chemical properties of the final composition depend in part on the agent through which the crosslinking, i.e., the cure, is effected.

Because the curing agent and the cure schedule affect the final properties of the resulting resinous composition which properties, in turn, determine the ultimate use of the resinous composition, it is obviously important to select the right type of composition for a particular requirement. In applications dependent on physical properties at elevated temperatures, for example, in the encapsulation of electronic circuits and in adhesives for aircraft, the cured compositions should have high heat distortion temperatures.

The heat distortion temperatures of cured epoxy compositions may be used as an indication of the range of temperatures over which the physical or electrical properties change.

The heat distortion temperatures of the cured resinous compositions of the present invention were determined by subjecting a test bar to a fiber stress of 264 pounds per square inch and determining the temperature at which a deflection of 10 mils resulted (ASTM Test Method D648–45T, as described in ASTM Standards, 1955 Edition, Part 6, pages 296–299).

An object of the present invention therefore is the production of new compositions of matter valuable for use as casting and potting compositions, adhesives, laminating agents, and the like. Another object of the present invention is to provide compositions containing glycidyl methacrylate which can be converted to transparent resinous compositions having extraordinarily high heat distortion temperatures. Other objects will become apparent as the invention is further described.

I have found that the foregoing objects may be attained when I prepare a composition comprising glycidyl methacrylate; pyromellitic dianhydride, maleic anhydride, or cyclopentanetetracarboxylic dianhydride or mixtures thereof; and an alcohol modifier.

In accordance with the present invention, a composition is prepared from glycidyl methacrylate; pyromellitic dianhydride, maleic anhydride, or cyclopentanetetracarboxylic dianhydride or mixtures thereof; and an alcohol modifier, the total amount of anhydride present being such that from about 0.55 to about 1.0 anhydride group is provided for each epoxide group and the alcohol being present in an amount such that from about 0.01 to about 0.9 alcoholic hydroxyl group is provided for each of the anhydride groups.

Resins from the composition of my invention may readily be prepared by mixing glycidyl methacrylate, the alcohol modifier, and the anhydride and thereafter curing the composition thus formed at from 50° to about 200° C.

The following examples illustrate specific embodiments of the method of preparation of and curing of compositions in accordance with the present invention. However, they are not to be construed as limiting the invention in any manner. The parts in the examples are parts by weight.

Example 1

To 25 parts of glycidyl methacrylate was added a premixed solution of 12 parts of polyethylene glycol having an average molecular weight of 400, and 0.1 part of dicyandiamide. Pyromellitic dianhydride (15 parts) then was added. This combination provided 0.9 anhydride group for each epoxide group and 0.4 alcoholic hydroxyl group for each anhydride group. The slurry was heated at 80° C. until the clear point was reached. (The clear point is the temperature at which the slurry or dispersion becomes a clear solution.) The mixture was cured at 180° C. for a period of 18 hours to yield a straw-colored, transparent resinous composition having a heat distortion temperature of 240° C.

Example 2

The procedure of Example 1 was followed except that 4.5 parts of diethylene glycol (0.55 alcoholic hydroxyl group for each anhydride group) was used instead of polyethylene glycol having an average molecular weight of 400, and 0.1 part of diisopropylamine as catalyst was used instead of dicyandiamide. A straw-colored, transparent resinous composition having a heat distortion temperature of 230° C. was obtained.

Example 3

The procedure of Example 1 was followed except that 9.0 parts of tetrahydrofurfuryl alcohol (0.6 alcoholic hydroxyl group was provided for each anhydride group) was used instead of polyethylene glycol having an average molecular weight of 400. A straw-colored, transparent resinous composition having a heat distortion temperature of 254° C. was obtained.

Example 4

The procedure of Example 1 was followed except that 8.0 parts of 2-ethylhexanol (0.4 alcoholic hydroxyl group for each anhydride group) was used instead of polyethylene glycol having an average molecular weight of 400. A straw-colored, transparent resinous composition having a heat distortion temperature of 278° C. was obtained.

Example 5

The procedure of Example 1 was followed except that 4.6 parts of methyl "Cellosolve" (0.4 alcoholic hydroxyl group was provided for each anhydride group) was used instead of polyethylene glycol having an average molecular weight of 400. A straw-colored, transparent resinous composition having a heat distortion temperature of 258° C. was obtained.

Example 6

The procedure of Example 1 was followed except that 6.8 parts of triethylene glycol (0.55 alcoholic hydroxyl group for each anhydride group) was used instead of polyethylene glycol having an average molecular weight of 400, and 0.1 part of diisopropylamine as catalyst was used instead of dicyandiamide. A straw-colored, transparent resinous composition having a heat distortion temperature of 243° C. was obtained.

Example 7

The procedure of Example 1 was followed except that 3 parts of polyethylene glycol having an average molecular weight of 1540 (0.02 alcoholic hydroxyl group was provided for each anhydride group) was used instead of polyethylene glycol having an average molecular weight of 400. The mixture was cured at 180° C. for 16 hours. A straw-colored, transparent resinous composition having a heat distortion temperature of 309° C. was obtained.

Example 8

The procedure of Example 1 was followed except that 11.4 parts of 2,2-bis[4-(2-hydroxypropoxy)phenyl]propane (Dow Resin 565, Dow Chemical Company) was used instead of polyethylene glycol having an average molecular weight of 400. The combination provided 0.4 alcoholic hydroxyl group for each anhydride group. A straw-colored, transparent resinous composition having a heat distortion temperature of 221° C. was obtained.

Example 9

Twenty-five parts of glycidyl methacrylate and 15 parts of pyromellitic dianhydride were charged to a resin pot. To the mixture was added a premixed solution of 3.5 parts of ethylene glycol (0.7 alcoholic group for each anhydride group) and 0.1 part of diisopropylamine. The mixture was heated until the clear point was reached (8 minutes at 73° C.) and then poured into a mold at room temperature. The mixture was cured at 180° C. for 18 hours. The straw-colored, transparent resinous composition obtained had a heat distortion temperature of 252° C.

Example 10

Twenty-five parts of glycidyl methacrylate and 15.5 parts of maleic anhydride were charged to a resin pot. To the mixture was added a premixed solution of 1.5 parts of diethylene glycol and 0.1 part of diisopropylamine. This combination provided 1 anhydride group for each epoxide group and 0.2 alcoholic hydroxyl group for each anhydride group. The mixture was slurried at 80° C. until the clear point was reached and then poured into a mold preheated to 120° C. The mixture was cured at 120° C. for a period of 2 hours and then at 180° C. for a period of 18 hours. The resinous composition obtained had a heat distortion temperature of 260° C.

Example 11

The procedure of Example 10 was followed except that 15.0 parts of cyclopentanetetracarboxylic dianhydride was used instead of maleic anhydride and the amount of diethylene glycol was 4.5 parts. This combination provided 1 anhydride group for each epoxide group and 0.5 alcoholic hydroxyl group for each anhydride group. A straw-colored, transparent resinous composition having a heat distortion temperature of 234° C. was obtained.

Example 12

The procedure of Example 1 was followed except that 17.0 parts of Dow Resin X2631 (Dow Chemical Company) was used instead of polyethylene glycol having an average molecular weight of 400. Dow Resin X2631 is a polyhydric alcohol prepared by the reaction of a novolak-type phenol-formaldehyde resin having an average of six phenolic hydroxyl groups and propylene oxide (excess). The physical properties of Dow Resin X2631 are: softening point, 170–180° F.; and viscosity, 50% solution in methyl ethyl ketone, 2–3 (Gardner-Holdt Scale). The combination provided 0.6 alcoholic hydroxyl group for each anhydride group. Diisopropylamine (0.1 part) was used as catalyst instead of dicyandiamide. A straw-colored, transparent resinous composition having a heat distortion temperature of 250° C. was obtained.

Example 13

One hundred parts of glycidyl methacrylate, 36 parts of 2,2-bis[4-(2-hydroxypropoxy)phenyl]propane, and 56 parts of pyromellitic dianhydride were charged to a resin pot. This combination provided 0.8 anhydride group for each epoxide group and 0.4 alcoholic hydroxyl group for each anhydride group. The mixture, while being stirred, was heated until the clear point was reached (2 minutes at 120° C.). The mixture then was poured into a mold and cured at 180° C. for 24 hours. A straw-colored, transparent resinous composition having a heat distortion temperature of 231° C. was obtained.

As is shown in the examples, resinous compositions having unusually high heat distortion temperatures were obtained when glycidyl methacrylate was cured with pyromellitic dianhydride, maleic anhydride, or cyclopentanetetracarboxylic dianhydride in the presence of an alcohol modifier. Although the use of glycidyl methacrylate was exemplified, other similar epoxide compounds, such as glycidyl acrylate, also may be used.

In addition to the previously-mentioned anhydride curing agents and mixtures thereof, other anhydrides which are suitable in the compositions of the invention include itaconic anhydride, 3-methylenecyclobutane-1,2-dicarboanhydride and mixtures thereof. The acid anhydride must be present in an amount such that from about 0.55 to about 1.0 anhydride group is provided for each epoxide group. When less than about 0.55 anhydride group is provided for each epoxide group, the heat distortion temperatures of the cured resinous compositions are lowered. When more than about 1.0 anhydride group is provided for each epoxide group, all of the anhydride is difficult to dissolve.

All alcohols are suitable in the compositions of the invention. Examples of several suitable alcohols are: ethylene glycol, diethylene glycol, triethylene glycol, polyethylene glycol having average molecular weights of 400 and 1540, 2-ethylhexanol, tetrahydrofurfuryl alcohol, methyl "Cellosolve," 2,2-bis[4-(2-hydroxypropoxy)phenyl]propane, Dow Resin X2631 (Dow Chemical Company) and mixtures thereof. Dihydric alcohols are the preferred modifiers with 2,2-bis[4-(2-hydroxypropoxy)phenyl]propane being particularly preferred. Suitable monohydric alcohol modifiers which may be used in the compositions of the invention are those which preferably contain from about 3 to about 11 carbon atoms. Monohydric alcohols containing less than 3 carbon atoms volatilize easily, whereas those alcohols containing more than 11 carbon atoms lower the heat distortion temperature of the compositions of the invention. The alcohols must be present in an amount such that from about 0.01 to about 0.9 alcoholic hydroxyl group is provided for each anhydride group. When less than 0.01 alcoholic hydroxyl group is provided for each anhydride group, the cured resinous composition becomes brittle and is subject to cracking. When more than 0.9 alcoholic hydroxyl group is provided for each anhydride group, the heat distortion temperature of the resinous composition is lowered.

A catalyst, although not required in the process of the invention as shown in Example 13, accelerates crosslinking. The catalyst may be an organic compound containing at least one amino group. Particularly suitable catalysts include p,p'-methylenedianiline, benzylamine, tert-butylamine, ethylenediamine, aniline, dimethylbenzylamine, nicotinic acid, the tris-2-ethylhexanoate of 2,4,6-tris(dimethylaminomethyl)phenol, glutamic acid, dicyandiamide, diisopropylamine and other like compounds known to those in the art. Diisopropylamine is the preferred catalyst. The catalysts are needed in only very small amounts.

The time needed to cure the composition of the invention may range from a few to several hours, depending mainly on the temperature at which the cure is effected, but also on the catalyst and alcohol modifier used and like factors generally. The temperature at which the cure is effected must be sufficient to allow for substantial crosslinking to occur. Generally, the composition may be cured at a temperature from about 50° to about 200° C. Below 50° C., cure periods are prolonged, and above 180° C., the mixture begins to char. The optimum curing schedule (time-temperature relationship) has been found to be from 6 to about 24 hours at 120° or 180° C., but again, these values may vary considerably depending on the properties desired in the cured composition and like factors generally.

The present invention has been described in detail in the foregoing. However, it will be apparent that many variations may be introduced without departure from the scope of the invention. I intend therefore to be limited only by the following claims.

I claim:

1. A composition of matter comprising glycidyl methacrylate, an anhydride member selected from the group consisting of pyromellitic dianhydride, maleic anhydride, and cyclopentanetetracarboxylic dianhydride, and an alcohol selected from the group consisting of monohydric alcohols of 3 to 11 carbon atoms and polyhydric alcohols having an average molecular weight of less than 1540, said alcohols containing no functional group reactive with the anhydride other than the hydroxyl group and in which each hydroxyl group is attached to a saturated carbon atom, the amount of said anhydride member being that which provides between about 0.55 and about 1.0 anhydride group for each epoxide group and the amount of said alcohol being that which provides between about 0.01 and about 0.9 alcoholic hydroxyl group for each anhydride group of said anhydride member.

2. A process which comprises adding to glycidyl methacrylate an anhydride member selected from the group consisting of pyromellitic dianhydride, maleic anhydride, and cyclopentanetetracarboxylic dianhydride, and an alcohol selected from the group consisting of monohydric alcohols of 3 to 11 carbon atoms and polyhydric alcohols having an average molecular weight of less than 1540, said alcohols containing no functional group reactive with the anhydride other than the hydroxyl group and in which each hydroxyl group is attached to a saturated carbon atom, the amount of said anhydride member being that which provides between about 0.55 and about 1.0 anhydride group for each epoxide group and the amount of said alcohol being that which provides between about 0.01 to about 0.9 alcoholic hydroxyl group for each anhydride group of said anhydride member, and heating the resulting mixture to a temperature from about 50° to about 200° C.

3. The process as claimed in claim 2, wherein the reaction is effected in the presence of a catalytic amount of an organic catalyst compound containing at least one amino group.

4. The process as claimed in claim 3, wherein the compound containing at least one amino group is diisopropylamine.

5. The process as claimed in claim 3, wherein the compound containing at least one amino group is dicyandiamide.

6. A composition of matter comprising glycidyl methacrylate, pyromellitic dianhydride, in an amount sufficient to provide between about 0.55–1.0 anhydride group for each epoxide group, and an alcohol selected from the group consisting of monohydric alcohols of 3 to 11 carbon atoms and polyhydric alcohols having an average molecular weight of less than 1540, said alcohols containing no functional group reactive with the anhydride other than the hydroxyl group and in which each hydroxyl group is attached to a saturated carbon atom and said alcohol being present in an amount sufficient to provide between about 0.01–0.9 alcoholic hydroxyl group for each anhydride group of the pyromellitic dianhydride.

7. A hardened, cured, polymerized mixture of glycidyl methacrylate, an organic anhydride selected from the group consisting of pyromellitic dianhydride, maleic anhydride, and cyclopentanetetracarboxylic dianhydride, and an alcohol selected from the group consisting of monohydric alcohols of 3 to 11 carbon atoms and polyhydric alcohols having an average molecular weight of less than 1540, said alcohols containing no functional group reactive with the anhydride other than the hydroxyl group and in which each hydroxyl group is attached to a saturated carbon atom, the components of said mixture providing, prior to curing and polymerization, an anhydride to epoxide ratio of about 0.55–1.0 to 1, and an alcoholic hydroxyl group to anhydride group ratio between about 0.01–0.9 to 1.

8. A hardened, cured, polymerized mixture of glycidyl methacrylate, pyromellitic dianhydride, and an alcohol selected from the group consisting of monohydric alcohols of 3 to 11 carbon atoms and polyhydric alcohols having an average molecular weight of less than 1540, said alcohols containing no functional group reactive with the anhydride other than the hydroxyl group and in which each hydroxyl group is attached to a saturated carbon atom, the components of said mixture providing, prior to curing and polymerization, an anhydride to epoxide ratio of about 0.55–1.0 to 1, and an alcoholic hydroxyl group to anhydride group ratio between about 0.01–0.9 to 1.

References Cited in the file of this patent

UNITED STATES PATENTS

| | | |
|---|---|---|
| 2,556,075 | Erickson | June 5, 1951 |
| 2,680,109 | Stevens et al. | June 1, 1954 |
| 2,708,188 | Goldstein | May 10, 1955 |
| 2,720,500 | Cody | Oct. 11, 1955 |
| 2,772,296 | Mueller | Nov. 27, 1956 |
| 2,781,333 | Updegraff | Feb. 12, 1957 |
| 2,801,232 | Suen et al. | July 30, 1957 |
| 2,839,495 | Carey | June 17, 1958 |
| 2,890,196 | Phillips et al. | June 9, 1959 |